US010432677B2

(12) United States Patent
Carter et al.

(10) Patent No.: US 10,432,677 B2
(45) Date of Patent: Oct. 1, 2019

(54) PERSONALIZING A SOCIAL NETWORKING PROFILE PAGE

(71) Applicant: International Business Machines Corporation, Armonk, NY (US)

(72) Inventors: Bernadette A. Carter, Raleigh, NC (US); Arthur R. Francis, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 576 days.

(21) Appl. No.: 13/739,359

(22) Filed: Jan. 11, 2013

(65) Prior Publication Data

US 2014/0201269 A1     Jul. 17, 2014

(51) Int. Cl.
| H04L 29/06 | (2006.01) |
| G06Q 30/02 | (2012.01) |
| G06Q 50/00 | (2012.01) |
| H04L 12/58 | (2006.01) |

(52) U.S. Cl.
CPC ....... H04L 65/403 (2013.01); G06Q 30/0269 (2013.01); G06Q 50/01 (2013.01); H04L 51/32 (2013.01)

(58) Field of Classification Search
CPC .................. G06F 17/30699; G06F 17/30867
USPC ................................................. 709/204, 224
See application file for complete search history.

(56) References Cited

U.S. PATENT DOCUMENTS

| 2005/0267766 A1* | 12/2005 | Galbreath et al. ................. 705/1 |
| 2009/0228486 A1* | 9/2009 | Kuehr-McLaren et al. ...... 707/9 |
| 2010/0030578 A1* | 2/2010 | Siddique ............ G06Q 10/0637 705/3 |
| 2011/0016161 A1 | 1/2011 | Loeb |
| 2011/0042453 A1 | 2/2011 | Jhanji |
| 2011/0225170 A1* | 9/2011 | Obasanjo .......... G06F 17/30864 707/748 |
| 2012/0124479 A1* | 5/2012 | Morin ............... G06F 17/30905 715/741 |
| 2012/0150888 A1* | 6/2012 | Hyatt et al. ................... 707/758 |
| 2012/0166433 A1* | 6/2012 | Tseng ................. G06Q 30/0224 707/728 |

(Continued)

*Primary Examiner* — William G Trost, IV
*Assistant Examiner* — Christopher P Cadorna
(74) *Attorney, Agent, or Firm* — Fabian VanCott; Steven L. Nichols (57) ABSTRACT

A computer network comprising a number of user devices and a preferences control module, in which the preferences control module receives user preferences from an owner of a social network profile, receives data describing a viewer of the owner's social networking profile, and distinguishes a number of artifacts on the owner's social networking profile from other artifacts on the profile based on the user preferences and data describing a viewer of the owner's social networking profile. A method of personalizing a social networking profile page within a computer network, the method comprising receiving user preferences from an owner of a social network profile, receiving data describing a viewer of the owner's social networking profile, and differentiating artifacts available on the owner's social networking profile based on the user preferences and data describing a viewer of the owner's social networking profile.

20 Claims, 4 Drawing Sheets

(56) References Cited

U.S. PATENT DOCUMENTS

| | | | |
|---|---|---|---|
| 2013/0086078 A1* | 4/2013 | Malleshaiah | G06Q 30/02 707/748 |
| 2013/0185285 A1* | 7/2013 | Shuman | G06F 17/30554 707/722 |
| 2013/0246040 A1* | 9/2013 | DeLuca et al. | 704/2 |
| 2014/0025596 A1* | 1/2014 | Brikman et al. | 705/319 |

\* cited by examiner

PERSONALIZING A SOCIAL NETWORKING PROFILE PAGE

BACKGROUND

Social network services provide a platform or site on which a user of a computing device may interact, make connections, and collaborate with an online community of people with similar interests, needs, and goals. In order to interact with others on the social network, a user may upload data to the social network service or otherwise actuate certain features offered on the social network service. Often a user may interact with a number of different users with each user potentially having differing interests, needs or expectations. While interaction and events on the social networking service occur, the social networking service may list those interactions and events on the user's personal profile page. These interactions may be listed chronologically.

SUMMARY

According to one example, the present specification discloses a computer network comprising a number of user devices and a preferences control module, in which the preferences control module receives user preferences from an owner of a social network profile, receives data describing a viewer of the owner's social networking profile, and distinguishes a number of artifacts on the owner's social networking profile from other artifacts on the profile based on the user preferences and data describing a viewer of the owner's social networking profile. According to another example, the present specification discloses a method of personalizing a social networking profile page within a computer network, the method comprising receiving user preferences from an owner of a social network profile, receiving data describing a viewer of the owner's social networking profile, and differentiating artifacts available on the owner's social networking profile based on the user preferences and data describing a viewer of the owner's social networking profile. In still another example, the present specification discloses a computer program product for personalizing a social networking profile page within a computer network, the computer program product comprising a computer readable storage medium comprising computer usable program code embodied therewith, the computer usable program code comprising computer usable program code to, when executed by a processor, receive user preferences from an owner of a social network profile, computer usable program code to, when executed by a processor, receive data describing a viewer of the owner's social networking profile, and computer usable program code to, when executed by a processor, differentiate artifacts available on the owner's social networking profile based on the user preferences and data describing a viewer of the owner's social networking profile.

BRIEF DESCRIPTION OF THE SEVERAL VIEWS OF THE DRAWINGS

The accompanying drawings illustrate various examples of the principles described herein and are a part of the specification. The illustrated examples do not limit the scope of the claims.

Throughout the drawings, identical reference numbers designate similar, but not necessarily identical, elements.

DETAILED DESCRIPTION

As described above, social networking sites provide a platform or site on which a user may interact with a number of different users that may or may not have similar interests, needs or expectations. During interaction with others on the social networking site, a user creates a profile. The profile may contain a collection of personal data associated with that user and may serve as a digital representation of a person's identity. The profile may also contain all the information associated with the user's interactions with others on the social networking site as well as any computer generated information resulting from those interactions. The information associated with the user's interactions with others on the social networking site is broken down into separate entries on the site and is often referred to as a "post" or more broadly as an "artifact." These two sources of information serve to present a new user of the social networking site with a first impression of the user who owns the profile. In some cases, the new viewer may construct a perceived persona in his or her mind based upon the information that is most easily consumed. In some situations, the artifacts that are most easily consumed are those artifacts that had most recently occurred and that appear first chronologically on the user's profile.

Some of the artifacts posted on the user's profile page, however, may contain information that is not of any particular use to a new viewer or that is even potentially embarrassing or otherwise problematic if that new user were to see it. The irrelevant information in particular may not appropriately convey the true persona of the profile owner to the new viewer. Additionally, any embarrassing information may give the new viewer a poor first impression of the owner of the profile. As a consequence of the inclusion of this information, the owner of the profile may be cast in a poor light socially or may lose out on potential benefits associated with being connected with the new viewer of the profile. When the profile owner is using the social networking site for business purposes as well as personal, the inclusion of irrelevant or embarrassing artifacts may affect his or her ability to receive work from others in the community or otherwise be respected in that community.

Even further, the some artifacts associated with the profile may contain time sensitive information that will eventually become outdated. These posts may include, for example, information describing where the profile owner is or why he or she may not be able to be contacted. While these events occur, the social network owner may want this to be displayed to a new viewer. Conversely, as time progresses, the profile owner may de-emphasize or suppress older posts that relate to topics such as "email is down," "stuck in traffic," or any other time sensitive post that may not convey a positive contribution.

Therefore, instead of allowing a new viewer to see any of these irrelevant artifacts, the profile owner may wish to highlight certain artifacts. Therefore, the present specification describes a system and method that provides a way to distinguish some artifacts from others by emphasizing, de-emphasizing, and filtering artifacts on a user's profile such that the type and number of artifacts automatically change over time based upon the profile owner's desired digital persona and level or state of relationship between the viewer and the profile owner. This may be done while still providing time-sensitive information to all viewers of the owner's profile.

Aspects of the present disclosure may be embodied as a system, method or computer program product. Accordingly, aspects of the present disclosure may take the form of an entirely hardware embodiment, or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable. RF, etc., or any suitable combination of the foregoing. Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language indicates that a particular feature, structure, or characteristic described in connection with that example is included as described, but may not be included in other examples.

In the specification and in the appended claims the term "social networking service" is meant to be understood broadly as and online community where people with similar interests, needs, and goals can interact, make connections, and collaborate. Additionally, the terms "social networking site" or "social networking website" may refer to any virtual or graphical representation of the services provided by the social networking service. In one example, this may be represented to a user on a graphical user interface as a personal web page that is modifiable. The social networking service may execute a number of computer programs so present a viewer or user with the graphical representation of the webpage. Some non-limiting and non-exclusive examples of types of social networking sites may include public, private, and corporate forums, blogs, reverse blogs, microblogs, and message boards. Some non-limiting and non-exclusive examples of social networking sites may include FACEBOOK®, TWITTER®, LINKEDIN®, GOOGLE+®, and MYSPACE®.

Additionally, in the specification and in the appended claims the term "artifact" is meant to be understood broadly as any file, object, or other piece of data that is created, used, or uploaded during the execution of a process on a social networking site. An artifact may therefore include any typed, attached, or computer generated information that is presented on a social network site. Some non-limiting and non-exclusive examples may include typed out status updates, uploaded photographs, system generated notifications, among others.

Figure 1:
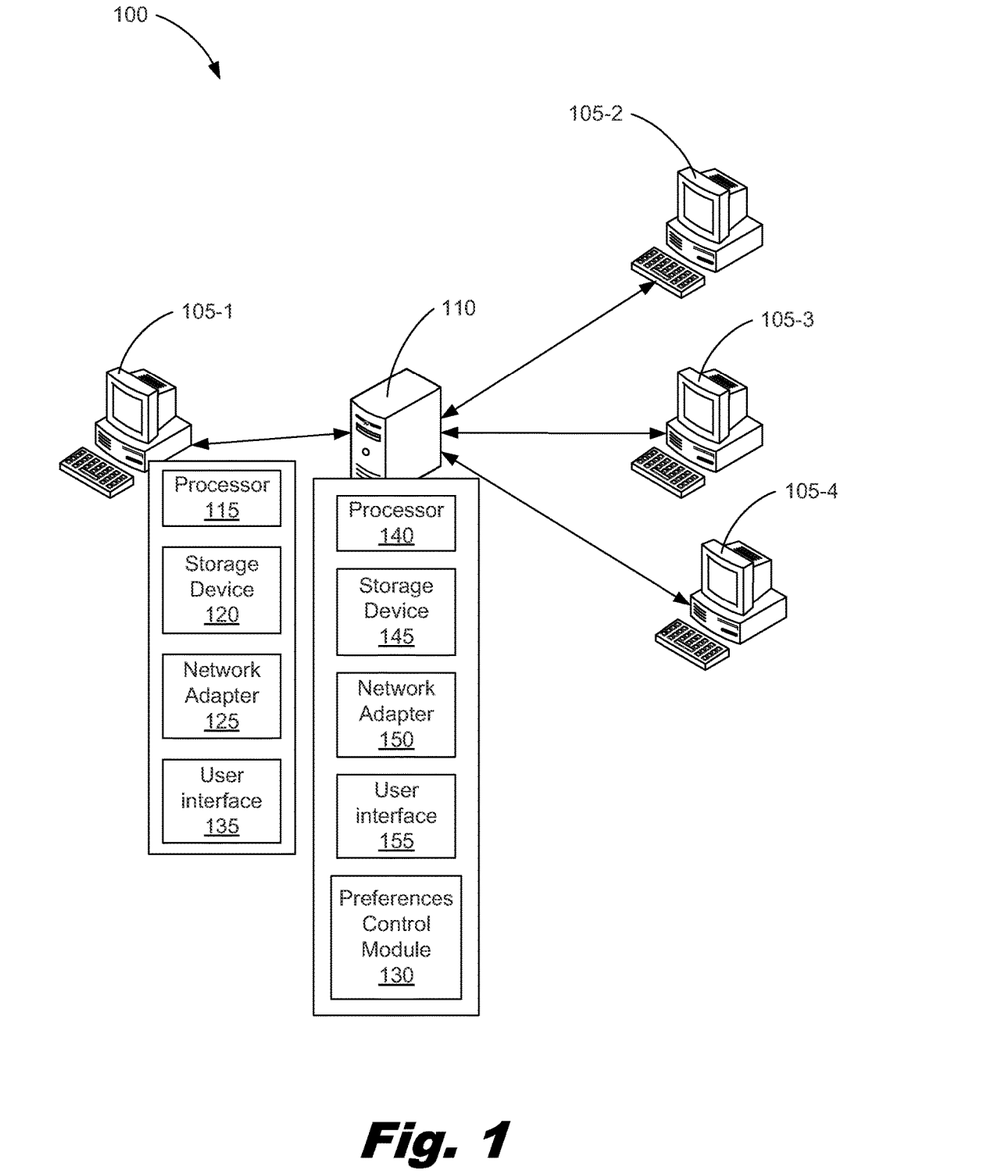
FIG. 1 is a block diagram of a computer network which may be used in connection with a social network service according to one example of the principles described herein.

Turning now to FIG. 1, a block diagram of a computer network (100) which may be used in connection with a social network service is shown according to one example of the principles described herein. The computer network (100) may comprise a number of user devices (105-1, 105-2, 105-3, 105-4) and a social network server (110). Although FIG. 1, shows the computer network (100) using a central server (110) to allow individual users of the individual user devices (105-1, 105-2, 105-3, 105-4) to socialize, other types of architectures such as a distributed social network may be used. The present specification, therefore, contemplates the use of these other types of device networks.

The user devices (105-1, 105-2, 105-3, 105-4) may each comprise a processor (115), a storage device (120), a network adapter (125), and a user interface (135). The processor (115) receives instructions from computer readable program code stored on the storage device (120). The computer readable program code may be used by the processor to at least establish a network connection with any number of other user devices (105-1, 105-2, 105-3, 105-4) and the social network server (110), accept and send input to the other user devices (105-1, 105-2, 105-3, 105-4) and the social network server (110), and otherwise accept instructions from a user of the user device (105-1, 105-2, 105-3, 105-4) to affect those actions engaged in while the user is accessing a social network online. Similar to the above user devices (105-1, 105-2, 105-3, 105-4), the social network server (110) may also comprise a processor (140), a storage device (145), a network adapter (150), and a user interface (155).

Although FIG. 1 shows that the user devices (105-1, 105-2, 105-3, 105-4) are desktop computers, the user devices (105-1, 105-2, 105-3, 105-4) may be any type of computing device capable of connecting to and communicating with a computer network. The user devices (105-1, 105-2, 105-3, 105-4) may therefore include desktop computers, laptop computers, tablet devices, personal digital assistants, smartphones, networking devices, and servers, among others. Additionally, any number of user devices (105-1, 105-2, 105-3, 105-4) may be communicatively coupled to the network.

The storage device (120) may store data such as executable program code that is executed by the processor (115) or other processing devices. As will be discussed, the storage device (120) may specifically store a number of applications or other computer readable program code that the processor (115) executes to implement at least the functionality of the system and method described herein.

The storage device (120) may include various types of memory modules, including volatile and nonvolatile memory. For example, the data storage device (120) of the present example includes Random Access Memory (RAM), Read Only Memory (ROM), and Hard Disk Drive (HDD) memory. Many other types of memory may also be utilized, and the present specification contemplates the use of many varying type(s) of memory in the storage device (120) as may suit a particular application of the principles described herein. In certain examples, different types of memory in the storage device (120) may be used for different data storage needs. For example, in certain examples the processor (115) may boot from Read Only Memory (ROM), maintain non-volatile storage in the Hard Disk Drive (HDD) memory, and execute program code stored in Random Access Memory (RAM).

The storage device (120) may comprise a computer readable medium or any combination of a number of computer readable mediums. For example, the data storage device (120) may be, but not limited to, a system, apparatus, or device implementing electronic, magnetic, optical, electromagnetic, infrared, or semiconductor devices or any suitable combination of the foregoing. The computer readable medium may be a computer readable signal medium or a computer readable storage medium as described above.

A network adapter (125) is also included with the user devices (105-1, 105-2, 105-3, 105-4). The network adapter (125) may provide communication between the individual user devices (105-1, 105-2, 105-3, 105-4) and the social network server (110). As will be described below, the network adapter (125) may provide the users of the user devices (105-1, 105-2, 105-3, 105-4) with the ability to uploaded and download content provided on a social network. Additionally, the network adapter (125) may provide the users of the user devices (105-1, 105-2, 105-3, 105-4) with the ability to communicate user preferences to the social network server (110) such that certain artifacts associated with the user's profile may be distinguished from other artifacts. This may be done by, for example, emphasizing, de-emphasizing, or filtering artifacts according to these preferences.

The network adapter (125) may facilitate a wired or wireless communication. In the example above where the user device (105-1, 105-2, 105-3, 105-4) is a smartphone, the network adapter (125) may facilitate the actions described herein using a wireless internet connection. Alternatively, the network adapter (125) may facilitate the actions described above using a cellular network connection. Still further, the network adapter (125) may facilitate the actions described herein using a number of other connection methods both wired and wireless such as a LAN line connection, an optical fiber line connection, a Bluetooth connection, and an Ethernet connection, among others.

The user devices (105-1, 105-2, 105-3, 105-4) may further comprise a user interface (135). The user interface (135) may be comprised of hardware or hardware and software that enables a user to interact with the system (100), any programs being executed by the processors on the user devices (105-1, 105-2, 105-3, 105-4), and the user devices (105-1, 105-2, 105-3, 105-4) themselves. In one example, an owner of a profile may be able to select preferences indicative of how artifacts on the profile are to be distinguished from other artifacts. In some examples, the differentiation of artifacts may be accomplished by suppressing, emphasizing, de-emphasizing, or filtering some artifacts on a social network through the user interface (135). Specifically, as will be described later, a profile owner may be allowed to alter their profile through the user interface (135) so as to portray the digital persona that he or she desires while not undermining the positive benefits of providing relevant real-time information to all other users on the social network site. In one example, the system (100) may initially hide artifacts that don't support the first impression that the owner of the profile is trying to make. Additionally, the system (100) may hide artifacts that don't provide relevant time-sensitive information.

As described herein, the emphasis of any artifact may be represented to a viewer is a number of way. In one example, the emphasis of an artifact may be a result of other non-emphasized artifacts not being displayed on the user interface (135). In another example, the emphasis of any particular artifact may be represented by emphasized artifacts being enlarged on the user interface (135) while non-emphasized artifacts are not made larger or alternatively made smaller. In yet another example, the emphasis of any particular artifact may be represented by emphasized artifacts being presented in another color as opposed to the non-emphasized or de-emphasized artifacts. In still another example, the emphasis of any particular artifact may be represented by emphasized artifacts being presented at the top of an artifact stream while the non-emphasized artifacts appear at the bottom. In this example, the chronology of the artifacts may be ignored. In general, the emphasis of any particular artifact may be any visual differentiation between emphasized and non-emphasized artifacts, and the present disclosure contemplates the use of these other visual differentiations.

In some examples, although the owner of the profile had chosen to suppress or hide certain artifacts, the viewer of the profile may be allowed to select an option on the profile to see the suppressed information. In some examples, data selected for emphasis by the profile owner may be determined based upon the perceived persona that the system infers the profile owner would prefer, any specific topics and/or skills related to the profile owner or the viewer, and any time relevance.

In some examples, an owner of a profile may select a preference such that the system (100) can monitor how often a viewer views suppressed data. After monitoring this, the system (100) may decide, upon the owner's preferences, to completely remove those artifacts from the view of the viewer. This may allow the owner of the profile to more positively direct the viewer to those artifacts that the owner wishes to present to that specific viewer or type of viewer while preventing the viewer from seeing those artifacts the owner does not want the viewer to see.

Figure 2:
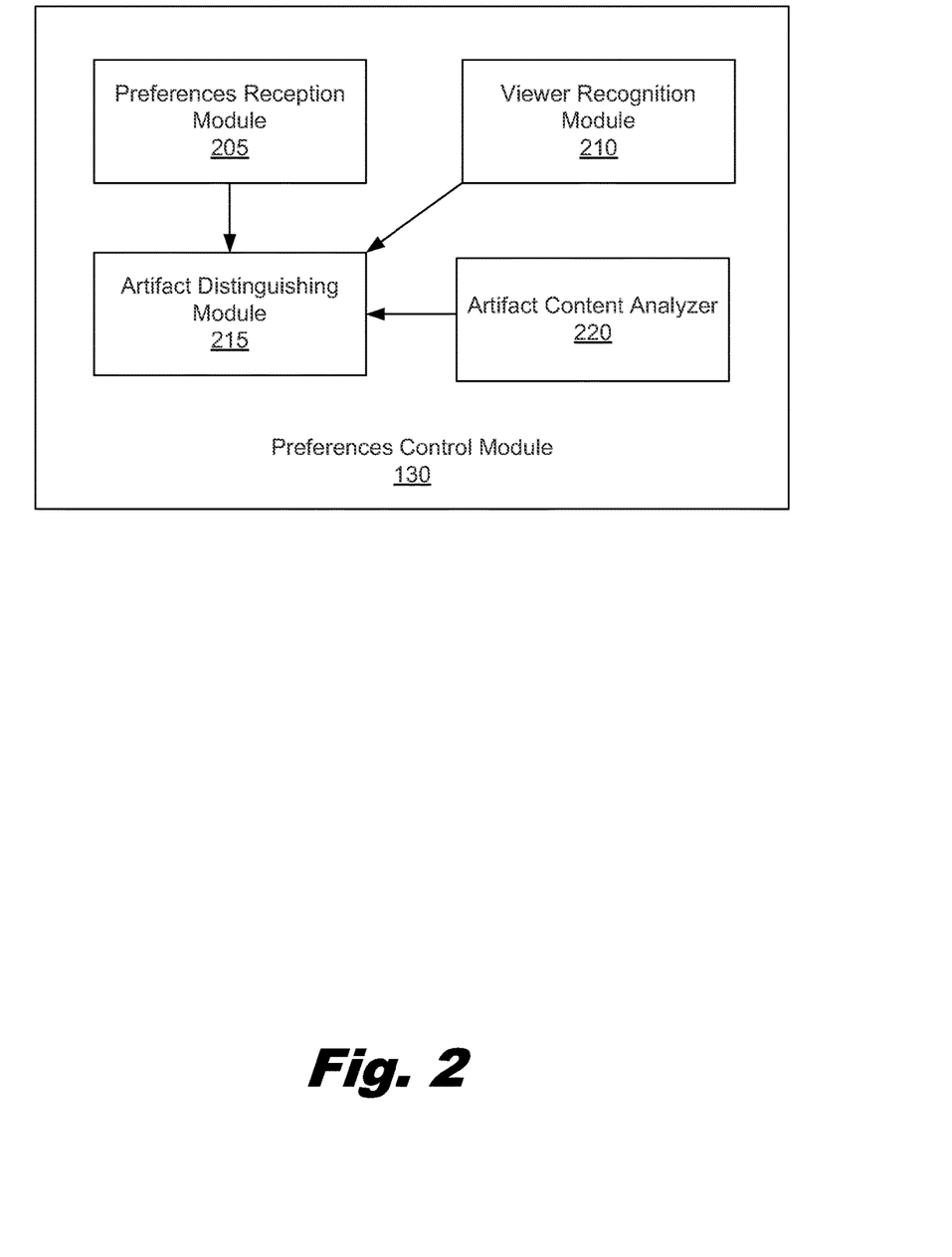
FIG. 2 is a block diagram showing the preferences control module of FIG. 1 according to one example of principles described herein.

The system (100) may generally be used by a user in order to engage in activities associated with an online social network. One user may be allowed to view artifacts posted on the social network by other users of the various other user devices (105-1, 105-2, 105-3, 105-4). Additionally, an owner of a profile may be able to access a preferences control module (130) in order to set the various preferences described herein. FIG. 2 is a block diagram showing the preferences control module (130) of FIG. 1. The preferences control module (130) comprises a preferences reception module (205). The preferences reception module (205) receives input from a profile owner indicative of how the profile owner wants his or her profile page to look when a viewer views that profile. The preferences reception module (205) may therefore receive instructions from the owner of the profile based on who the viewer is or how often the viewer has viewed his or her profile page. Therefore, the present preferences set the by owner of the profile and received by the preferences reception module (205) may be as general or specific as the owner intends and the present description anticipates this level of specificity or generality.

In one example, the preferences reception module (205) receives instructions from a profile owner using a user device (105-1, 105-2, 105-3) indicating that certain artifacts relevant to personal tasks and skills associated with the profile owner's current job are to be emphasized. During this process, certain other artifacts may be suppressed or de-emphasized such that a viewer cannot see the information. In one example, the suppression of these artifacts may result in a link being provided to the viewer of the profile such that selection of the link will allow the viewer to access those suppressed artifacts. In another example, the suppression of the artifacts may result in the viewer not being able to gain access or otherwise view the suppressed artifacts.

For example, the owner of the profile may wish that the artifacts associated with his or her interactions with certain members of a development team should be emphasized. As such the user may select a preference presented on the user interface (FIG. 1, 135) by the preference control module (130) indicating that any activity associated with members of that development team should be emphasized over all other content. In other examples, the owner of the profile may be allowed to give a numerical number to each type of artifact such that some artifacts are emphasized more than others while some may be deemphasized or removed from view entirely.

The preferences control module (130) may further include a viewer recognition module (210). The viewer recognition module (210) may recognize any viewer accessing the profile page owned by the owner and be able to further help configure the owner's preferences. In one example, the owner of the profile may direct what information is presented to a new viewer of his or her profile. Therefore, the viewer recognition module (210) may not only recognize who is viewing the owner's profile but also how many times that viewer has accessed the profile and how long the viewer and the owner of the profile have been acquainted on the social networking site. The viewer recognition module (210) may also gather additional information from other sources such as email accounts and phone logs to determine the number of times the owner and viewer have interacted with each other. The viewer recognition module (210) may provide this information to an artifact distinguishing module (215) so that that the artifact distinguishing module (215) may implement the preferences of the owner received from the preferences reception module (205). The artifact distinguishing module (215) may then emphasize, de-emphasize, suppress, or filter the artifacts associated with the owner's profile according to the owner's preferences. As a result, an owner of a profile may specifically limit the amount and type of artifacts viewable by any specific person or type of person. The owner may therefore determine whether he or she wants a new viewer to see less than all of the artifacts.

The system (100) may further allow an owner to not only limit the viewable artifacts on the social networking site based on the fact that a new viewer is viewing the profile, but may further determine what viewable artifacts are emphasized based on the viewers status or association with the profile owner. For example, the viewer recognition module (210) may determine that a first time viewer accessing the owner's profile is a member of a profession into which the profile owner wishes to seek employment. As such, the user, through the use of the preferences reception module (205) and the user interface (FIG. 1, 135) may select a preference such that any artifact associated with, for example, the profession into which the profile owner wishes to seek employment is emphasized. To do so, the preferences control module (130) may further include an artifact content analyzer (220). The artifact content analyzer (220) may be able to analyze any content within an artifact and provide that analysis to the artifact distinguishing module (215). The artifact distinguishing module (215) may then take this data as well as the preference selections provided by the owner through the preferences reception module (205) and emphasize, de-emphasize, or filter the artifacts based on the viewer's association with the content of the artifacts. The owner of the profile may therefore control what artifacts are to be viewed by a specific type of viewer accessing his or her profile. These artifacts are emphasized as described above for the viewer.

Additional filters may be provided to the owner of the profile so that he or she may emphasize, de-emphasize, or filter artifacts associate with a number of classes and types of people who may view his or her profile. Some examples of these filters may include age of the viewer, profession of the viewer, gender of the viewer, hobbies of the viewer, interests of the viewer, groups to which the viewer belongs, and the length of the relationship between the owner of the profile and the viewer, among others. Using these classes, the owner of the profile may filter the artifacts on the outbound feeds such that the owner retains control of how much information to make available to the different members of each class of viewers.

In another example, the system (100) may determine that, over time, certain viewers may be allowed to view more artifacts on the owner's profile. In one example, the viewer recognition module (210) may determine the length of time that has passed since the owner of the profile and the viewer have been acquainted on the social networking site. In another example, the viewer recognition module (210) may determine the length of time that has passed since the owner of the profile have been acquainted professionally. Using this information, the system (100) may receive at the preferences reception module (205) an owner's preference indicating that as time passes an additional amount of artifacts are viewable to specific viewers. This may allow an owner of the profile to gradually allow a viewer access to other information about the owner after a relationship has been created between the two.

In yet another example, the viewer recognition module (210) may determine, with the artifact content analyzer (220), the subject matter of the viewer's and owner's artifacts and whether a particular subject has bee addressed by either individually. The viewer recognition module (210) may also analyze outside content using the artifact content analyzer to determine whether a particular subject has bee addressed by either individual. The artifact distinguishing module (215) may then emphasize any artifacts related to that subject such that the viewer may see the owner's opinion or insight on that subject when the viewer accesses the owner's profile. This may provide the owner and the viewer with at least a notification about if and how each of them feel about any particular subject and thereby potentially create a deeper relationship between the two.

As mentioned above, the owner of the profile may further allow time-sensitive artifacts to always be viewed. In this example, the user may select a preference provided on the user interface (FIG. 1, 135) to allow these time-sensitive artifacts to be viewed by all viewers. The preference reception module (205) may receive this selection and the artifact distinguishing module (215) will not de-emphasize this information. As described above, time-sensitive artifacts may include, for example, notifications presented on the owner's profile regarding where the owner is or when the owner would be available. The system will therefore provide a viewer with not only the best possible first impression, but also notifications as to if and when the owner may be contacted by phone or in person.

The above has described a system (100) through which an owner of a profile may cause the profile to show the best possible persona a viewer of his or her profile can see. In another example, the system (100) may further allow an owner of a profile to setup preferences such that a negative persona or first impression is conveyed to a first time viewer. Presenting a negative first impression to a first time viewer may cause the viewer to not want to associate with the owner of the profile. Additionally, the system (100) may provide an owner of a profile to de-emphasize, suppress, or delete certain artifacts while still having artifacts relating time sensitive information to the viewer. This may provide a first time viewer of the profile with a number of artifacts that cast the owner is a good light while also providing the viewer with knowledge about where the owner is or if, how and when he or she can contact the owner.

Figure 3:
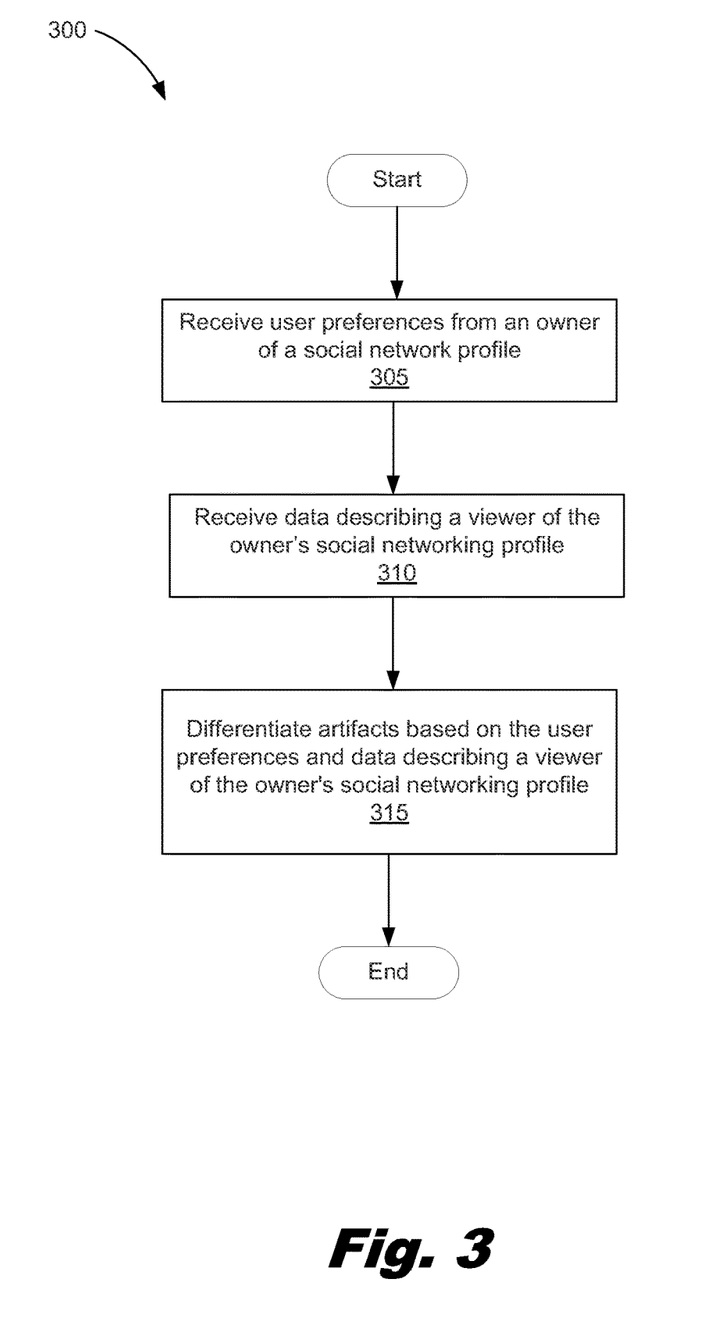
FIG. 3 is a flowchart showing a method for personalizing a social networking profile page according to one example of principles described herein.

FIG. 3 is a flowchart showing a method (300) for personalizing a social networking profile page according to one example of principles described herein. The method (300) may begin with the preferences control module (FIG. 2, 130) receiving (305) user preferences from an owner of a social network profile. As described above, the owner of a profile may set particular settings such that he or she can control what artifacts associated with his or her profile any particular viewer is allowed to view. In one example, the preferences may be set such that any type of viewer or single individual viewer is allowed by the owner of the profile to see emphasized and de-emphasized artifacts. Additionally, an owner of the profile may set the preferences such that a viewer may see all relevant time-related information regardless of whether the owner has caused some of the artifacts to be de-emphasized or not. Still further, an owner of the profile may set the preferences such that first time viewers of the owner's profile may see artifacts that are related to the viewer's class or interests. Even further, an owner of the profile may set the preferences such that artifacts will be suppressed or emphasized based on the content of each artifact.

Once the preferences control module (FIG. 2, 130) receives (305) the user preferences, the preferences control module (FIG. 2, 130) may further receive (310) data describing a viewer of the owner's social networking profile. As described above, this data may include the gender of the viewer, the age of the viewer, the interests of the viewer, the profession of the viewer, the relationship and content of interactions that the viewer has with the owner of the profile, the groups or organizations to which the viewer belongs, and the length of time which the viewer and the profile owner have been associated with each other, among others.

Once this data is received (305, 310) the preferences control module (FIG. 2, 130) may differentiate (315) artifacts based on the user preferences and data describing a viewer of the owner's social networking profile. The preferences control module (FIG. 2, 130) may do this by suppressing, emphasizing, de-emphasize, or filter (315) artifacts based on the user preferences and data describing a viewer of the owner's social networking profile. The specific suppression and emphasis of the various artifacts may depend on the user preferences selected by the owner of the profile. The suppression and emphasis of the artifacts is done on the outbound feeds, thereby allowing the profile owner to retain control of how much information is made available to the different classes of viewers of the profile. As noted briefly above, the suppression and emphasis of artifacts may result, based on the owner's selected preferences, in a profile that is either promoting a positive or negative perception of the owner of the profile.

Figure 4:
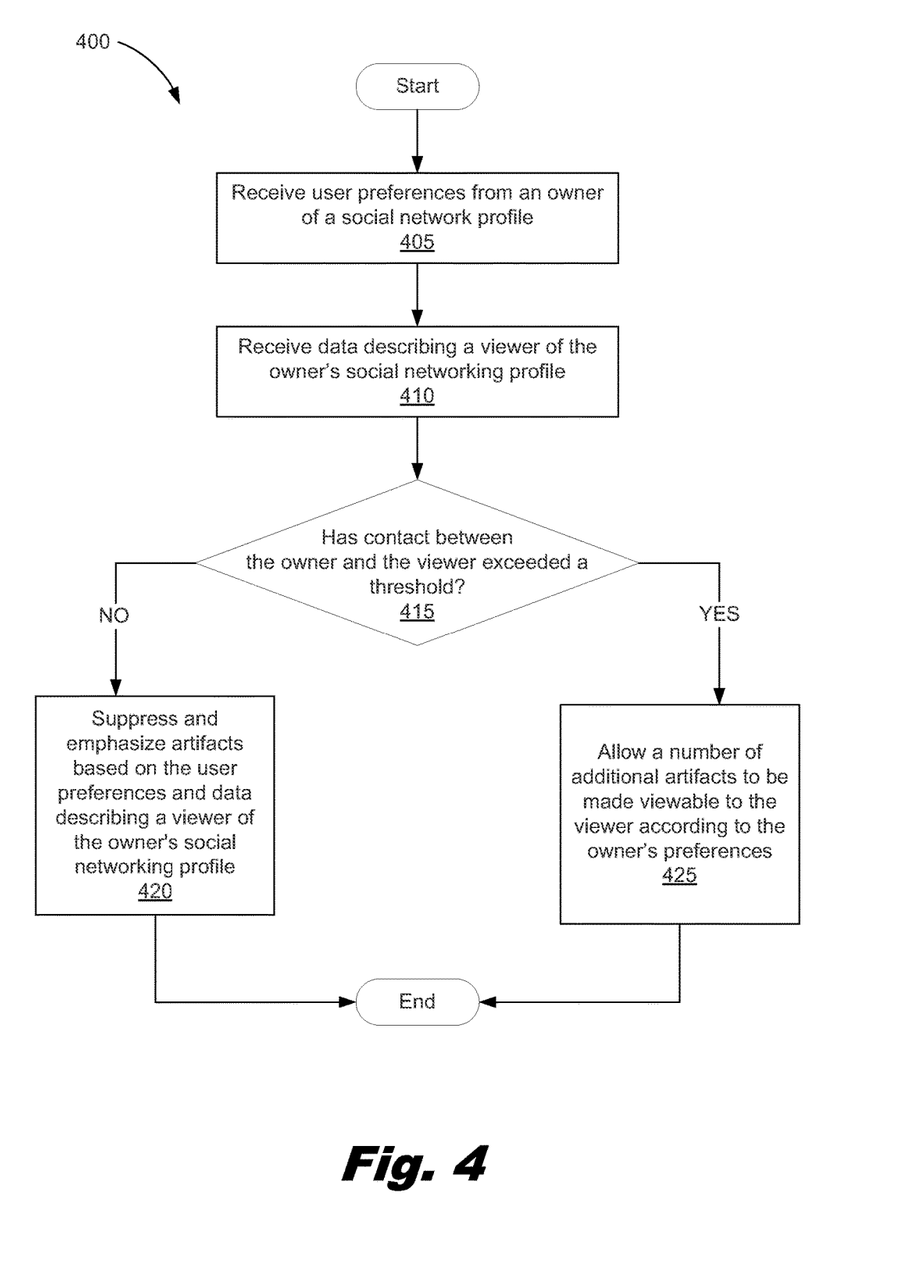
FIG. 4 is a flowchart showing a method for personalizing a social networking profile page according to another example of principles described herein.

FIG. 4 is a flowchart showing a method (400) for personalizing a social networking profile page according to another example of principles described herein. The method (400) may begin with the preferences control module (FIG. 2, 130) receiving (405) user preferences from an owner of a social network profile. Again, the owner of a profile may set particular settings such that he or she can control what artifacts associated with his or her profile any particular viewer is allowed to view.

Once the preferences control module (FIG. 2, 130) receives (405) the user preferences, the preferences control module (FIG. 2, 130) may further receive (410) data describing a viewer of the owner's social networking profile. This data may include specifics about the viewer as described above.

After this data is received (405, 410), the preferences control module (FIG. 2, 130) may further determine (415) if the contact between the owner of the profile and the viewer has exceeded a certain threshold. In determining this, the preferences control module (FIG. 2, 130) may receive additional information from, for example, the owner's and/or viewer's email accounts, phone logs, and artifacts. If the contact between the owner of the profile and the viewer has not exceeded a certain threshold set by the owner (415, Determination NO), then the preferences control module (FIG. 2, 130) may suppress (420) and emphasize (315) artifacts based on the user preferences and data describing a viewer of the owner's social networking profile without consideration of any past interaction between the owner and the viewer.

If the threshold amount of contact between the owner of the profile and the viewer has been exceeded (415, Determination YES) then the preferences control module (FIG. 2, 130) may execute further preferences set by the owner of the profile such that the viewer is allowed (425) to view additional artifacts on the owner's profile. Consequently, the owner of the profile may regulate how much information to allow any single viewer to view and have that amount adjusted over time as the relationship matures. This may provide an owner with the ability to gradually introduce a viewer into more personal information over time without potentially presenting the viewer initially with a bad first impression. As mentioned above, an owner of a profile may include both business and personal related artifacts on his or her profile. Some of those personal artifacts may relate to highly contentious opinions centered around, for example, politics or religion. As these topics, in some circumstances, may not even be relevant to a business relationship, as the viewer and owner create a deeper relationship, the owner of the profile may wish to share more personal opinions. Sharing these opinions and views at the right time may be used in both creating and maintaining a business and personal relationship with a viewer.

As briefly described above, the present method may also be embodied in a computer program product. Therefore, in one example the system and method may be embodied in a computer program product for personalizing a social networking profile page. The computer program product may comprise a computer readable storage medium comprising computer usable program code embodied therewith. The computer usable program code may comprise computer usable program code to, when executed by a processor, receive user preferences from an owner of a social network profile. The computer usable program code may also comprise computer usable program code to, when executed by a processor, receive data describing a viewer of the owner's social networking profile. The computer usable program code may further comprise computer usable program code to, when executed by a processor, suppress and emphasize artifacts based on the user preferences and data describing a viewer of the owner's social networking profile. Even further, the computer usable program code may further comprise computer usable program code to, when executed by a processor, determine if the contact between the owner of the profile and the viewer has exceeded a certain threshold and, if the threshold amount of contact between the owner of the profile and the viewer has been exceeded, then the computer usable program code may cause the execution of additional preferences set by the owner of the profile such that the viewer is allowed to view additional artifacts on the owner's profile.

The flowchart and block diagrams in the Figures illustrate the architecture, functionality, and operation of possible implementations of systems, methods and computer program products according to various examples of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The specification and figures describe a system and method of personalizing a social networking profile such that the owner of the profile may present a viewer with the best possible persona. The system and method may further allow a user to customize preferences associated with the profile so as emphasize more relevant artifacts to a first time viewer. Even further, the system and method may allow an owner of the profile to set the preferences such that after a length of time, a new viewer will be able to view more artifacts than he or she had initially been allowed to view the first time he or she had accessed the owner's profile page. Even further, the owner of the profile page may be allowed to set the above preferences to apply generally or specifically to any group of viewers or any single viewer. Still further, the owner of the profile may be allowed to set up preferences such that a negative persona is presented to a viewer of the owner's profile. As a result, this viewer may be deterred from contacting the owner.

The preceding description has been presented to illustrate and describe examples of the principles described. This description is not intended to be exhaustive or to limit these principles to any precise form disclosed. Many modifications and variations are possible in light of the above teaching.

What is claimed is:

1. A computer network comprising:
   a number of user devices; and
   a preferences control module;
   in which the preferences control module:
      receives user preferences from an owner of a social network profile;
      receives data describing a viewer of the owner's social networking profile; and distinguishes, with an artifact distinguishing module, a number of artifacts on the owner's social networking profile, via the emphasis and de-emphasis thereof, from other artifacts on the profile based on the user preferences and data describing a viewer of the owner's social networking profile; and provides a first of a number of versions of the owner's social networking profile to the viewer of the owner's social networking profile; the first version of the owner's profile comprising artifacts distinguished based on the data describing the viewer;

wherein the first version comprises emphasized artifacts based on the number of instances when the viewer has viewed the owner's profile; and wherein distinguishing a number of artifacts on the owner's social networking profile from other artifacts on the profile further comprises, with a preference reception module, receiving a selection so that the artifact distinguishing module does not engage in a de-emphasis of time-sensitive artifacts describing where the owner of the social networking profile is located and when the owner of the social networking profile will be available; and a viewer recognition module to:
receive input from a number of user devices descriptive of the number of instances of email interactions between the owner of the social networking profile and the viewer of the owner's social networking profile;
determine if a threshold number of instances of interaction have occurred; and
distinguish a number of artifacts on the owner's social networking profile from other artifacts on the profile based on the threshold being met.

2. The computer network of claim 1, in which distinguishing a number of artifacts on the owner's social networking profile from other artifacts on the profile comprises suppressing a number of the artifacts.

3. The computer network of claim 1, in which distinguishing a number of artifacts on the owner's social networking profile from other artifacts on the profile comprises emphasizing a number of the artifacts.

4. The computer network of claim 1, in which the preferences control module comprises:
a viewer recognition module; and
an artifact content analyzer.

5. The computer network of claim 4, in which the preferences reception module receives input from the number of user devices and in which the input describes preferences from the owner of the social network profile indicative of what artifacts presented on the profile are to be viewed by a viewer.

6. The computer network of claim 1, in which the viewer recognition module receives input from a number of user devices and in which the input describes:
the identity of the viewer;
the profession of the viewer;
the number of instances when the viewer has viewed the owner's profile;
how long the viewer and the owner of the profile have been acquainted;
or combinations thereof.

7. The computer network of claim 6, in which the viewer recognition module further receives input from phones logs to determine the number of instances when the owner of the profile and the viewer have interacted together.

8. The computer network of claim 6, in which:
the viewer recognition module further receives preferences from the owner of the profile indicating the owner's current or desired profession;
the artifact content analyzer analyzes the artifacts on the owner's social networking profile; and
based on the profession of the viewer, the artifact distinguishing module emphasizes those artifacts on the profile related to the profession of the viewer and which the owner of the profile has indicated as their current or desired profession when the viewer accesses the owner's profile.

9. The computer network of claim 4, in which the artifact content analyzer analyzes content within each artifact on the owner's profile to determine the subject matter of the content.

10. The computer network of claim 4, in which the artifact distinguishing module receives data from the preferences reception module, the viewer recognition module, and the artifact content analyzer and determines which artifacts among the number of artifacts on the owner's social networking profile should be suppressed, de-emphasized, emphasized, filtered, or combinations thereof.

11. A computer program product for personalizing a social networking profile page within a computer network, the computer program product comprising:
a computer readable storage medium comprising computer usable program code embodied therewith, the computer usable program code comprising:
computer usable program code to, when executed by a processor:
receive user preferences from an owner of a social network profile;
receive data describing a viewer of the owner's social networking profile;
differentiate artifacts available on the owner's social networking profile, via emphasis and de-emphasis thereof, based on the user preferences and data describing a viewer of the owner's social networking profile; each of the artifacts describing individual entries of user's interactions with other user's associated with a social networking site on which the social networking profile is maintained;
create a number of different versions of the owner's social networking profile and provide a first of the number of different versions to the viewer based on the data describing the viewer; and
monitor the number of instances when the viewer has viewed the owner's profile and change the number of artifacts viewable to the viewer based on an increase in the number of instances when the viewer has viewed the owner's profile;
wherein the computer usable program code to differentiate artifacts available on the owner's social networking profile further comprises computer usable program code to, when executed by a processor, receive a user preference indicating that time-sensitive artifacts are not to be differentiated during a period when information within the time-sensitive artifacts is temporally relevant and receive a user preference indicating that time-sensitive artifacts are to be differentiated when the information within the time-sensitive artifacts is not temporally relevant; the time-sensitive artifacts indicating where the owner is, a lapse in an ability to communicate with the owner, and when the owner would be available;

wherein monitoring the number of instances includes determining whether a number of instances of interaction over a phone between the owner and viewer have reached a threshold and differentiating artifacts based on the reaching of threshold.

12. The computer program product of claim 11, in which differentiating artifacts available on the owner's social networking profile based on the user preferences and data describing a viewer of the owner's social networking profile further comprises suppressing a number of artifacts, de-emphasizing a number of artifacts, emphasizing a number of artifacts, filtering a number of artifacts, or combinations thereof.

13. The computer program product of claim 11, further comprising computer usable program code to, when execute by a processor, receive input from a number of user devices on the computer network in which the input describes preferences from the owner of the social network profile indicative of what artifacts presented on the profile are to be viewed by a viewer.

14. The computer program product of claim 11, further comprising computer usable program code to, when executed by a processor, receive input from a number of user devices on the computer network in which the input describes the identity of the viewer, the number of instances when the viewer has viewed the owner's profile, how long the viewer and the owner of the profile have been acquainted, the number of instances when the owner of the profile and the viewer have interacted together, or combinations thereof.

15. The computer program product of claim 14, in which receiving data describing how long the viewer and the owner of the profile have been acquainted further comprises allowing an additional number of artifacts to be viewed by the viewer if a threshold amount of time has passed since the owner of the profile and the viewer have been acquainted has been met.

16. The computer program product of claim 14, in which receiving data describing the number of instances when the owner of the profile and the viewer have interacted together further comprises allowing an additional number of artifacts to be viewed by the viewer if a threshold amount of instances when the owner of the profile and the viewer have interacted together has been met.

17. A preference control module operating on a social networking server to, when executed by a processor:
receive data describing a viewer of a first social networking page, the first social networking page comprising a number of artifacts;
determine when contact between an owner of the first social networking page and the viewer has exceeded a threshold, wherein the contact between the owner and viewer is defined by phone logs descriptive of phone conversations between the owner and viewer; and
based on determining when contact between an owner of the first social networking page and the viewer has exceeded a threshold, present a customized version of the social networking page to the viewer by suppressing and emphasizing a number of artifacts presented on the page;
wherein suppressing and emphasizing a number of artifacts on the social networking page includes preventing the suppression of time-sensitive artifacts describing where the owner is and when the owner would be available on any customized version of the social networking page; and
wherein the prevention of the suppression of the time-sensitive artifacts is temporally limited based on temporal information within each of the time-sensitive artifacts.

18. The preference control module of claim 17, wherein a number of artifacts presented to the viewer are suppressed and emphasized based on a business relationship between the viewer and owner.

19. The preference control module of claim 18, wherein the viewer is allowed to view suppressed artifacts in the page after a threshold level of time has passed since the business relationship between the owner and the viewer has been exceeded.

20. The preference control module of claim 17, wherein the preference control module further receives information regarding a number of times a viewer has viewed a suppressed artifact and, based on a threshold number of times the suppressed artifact is viewed, delete that artifact.

* * * * *